United States Patent
Doll et al.

(10) Patent No.: US 10,332,233 B2
(45) Date of Patent: Jun. 25, 2019

(54) PRELOADING ANIMATION FILES IN A MEMORY OF A CLIENT DEVICE

(71) Applicant: Flipboard, Inc., Palo Alto, CA (US)

(72) Inventors: Evan Doll, Palo Alto, CA (US); Troy Brant, San Francisco, CA (US); Raphael Mauro Schaad, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 525 days.

(21) Appl. No.: 14/459,684

(22) Filed: Aug. 14, 2014

(65) Prior Publication Data

US 2015/0049093 A1 Feb. 19, 2015

Related U.S. Application Data

(60) Provisional application No. 61/866,028, filed on Aug. 14, 2013.

(51) Int. Cl.
*G06T 13/00* (2011.01)
*G06T 1/60* (2006.01)
*G06T 13/60* (2011.01)

(52) U.S. Cl.
CPC ............... *G06T 1/60* (2013.01); *G06T 13/60* (2013.01); *G06T 2200/16* (2013.01)

(58) Field of Classification Search
CPC . G09G 2354/00; G09G 2380/14; G06T 13/00
USPC .................................. 345/473, 211
See application file for complete search history.

(56) References Cited

U.S. PATENT DOCUMENTS

| | | | |
|---|---|---|---|
| 5,870,683 A | * | 2/1999 | Wells ............... H04M 1/72544 455/566 |
| 6,038,561 A | | 3/2000 | Snyder et al. |
| 7,472,340 B2 | | 12/2008 | Burago |
| 7,644,356 B2 | | 1/2010 | Atkins |
| 7,673,340 B1 | | 3/2010 | Cohen et al. |
| 9,037,592 B2 | | 5/2015 | Walkingshaw et al. |
| 9,092,529 B1 | | 7/2015 | Gyongyi et al. |
| 9,152,616 B2 | | 10/2015 | Ying |
| 9,396,167 B2 | | 7/2016 | Doll et al. |
| 2002/0059327 A1 | | 5/2002 | Starkey |
| 2009/0167768 A1 | * | 7/2009 | Bull ...................... G06T 13/00 345/473 |
| 2010/0123908 A1 | * | 5/2010 | Denoue ................ G06F 17/212 358/1.6 |
| 2011/0113041 A1 | | 5/2011 | Hawthorne et al. |
| 2011/0283210 A1 | | 11/2011 | Berger et al. |
| 2012/0089455 A1 | | 4/2012 | Belani et al. |

(Continued)

*Primary Examiner* — Weiming He
(74) *Attorney, Agent, or Firm* — Fenwick & West LLP

(57) ABSTRACT

A digital magazine presents content items to a user including one or more animation files. An animation file includes a plurality of frames that each has a variable display duration. To improve presentation of an animation file, a number of frames of the animation file that are preloaded into a memory of the client device on which the animation file is presented is determined based on contextual features describing computing resources available to the client device and on the display duration of frames of the animation file subsequent to a currently displayed frame of the animation file. Additionally, an animation file may be selected for preloading and display from a plurality of animation files based on a ranking the animation files.

18 Claims, 6 Drawing Sheets

(56) References Cited

U.S. PATENT DOCUMENTS

| | | |
|---|---|---|
| 2012/0159314 A1 | 6/2012 | Schrier et al. |
| 2012/0169741 A1* | 7/2012 | Adachi ................ G06F 9/4443 |
| | | 345/474 |
| 2012/0294514 A1 | 11/2012 | Saunders et al. |
| 2013/0024757 A1 | 1/2013 | Doll et al. |
| 2013/0332593 A1 | 12/2013 | Patnaikuni et al. |
| 2014/0068654 A1 | 3/2014 | Marlow et al. |
| 2014/0074863 A1 | 3/2014 | Walkingshaw et al. |
| 2014/0226901 A1* | 8/2014 | Spracklen .......... H04N 21/4621 |
| | | 382/167 |
| 2015/0151913 A1 | 6/2015 | Wong |

* cited by examiner

PRELOADING ANIMATION FILES IN A MEMORY OF A CLIENT DEVICE

CROSS-REFERENCE TO RELATED APPLICATION

This application claims the benefit of U.S. Provisional Application No. 61/866,028, filed Aug. 14, 2013, which is hereby incorporated in its entirety.

BACKGROUND

This invention relates generally to display of digital magazines on a client device and more particularly to preloading animation files for display in a digital magazine.

Publishers of digital content present content on different devices with different display areas, different display resolutions, different content download speeds, and different processing capabilities. Different devices of the same type may have different capabilities to display content as a result of different settings and different concurrently running applications. When a publisher includes animation files in a digital magazine, these factors complicate display of animation files to different users. Improperly presenting animation files impairs user interaction with the digital magazine, which decreases the likelihood of user interaction with the digital magazine. For example, delayed or erratic animation playback of an animation file presented by a digital magazine decreases the likelihood of additional user interaction with the digital magazine. Integrating animation files into a digital magazine so the animation files are correctly presented maintains user engagement with the digital magazine. However, the diverse variety of computing devices that may display the digital magazine makes it impractical to devise a separate implementation for presenting animated files for each device or for each configuration of each device.

SUMMARY

A digital magazine is a personalized, customizable application for displaying content items to a user of a client device (such as a mobile communication device, tablet, computer, and any other suitable computing system). Content items may include text, images, and animation files, which include a sequence of multiple frames of images to be displayed in a specific order. A digital magazine server selects content items included in a digital magazine and communicates the selected content items to a client device for presentation to a user via an application executing on the client device and associated with the digital magazine server.

When displaying an animation file in a digital magazine, a client device preloads frames into memory, such as a buffer, to expedite retrieval of various frames. To more efficiently present an animation file to a user, an application associated with the digital magazine server and executing on the client device determines contextual features about the client device and selects a number of frames to load into the memory based at least in part on one or more of the contextual features. The contextual features provide information about computing resources used by the client device to display content items. Examples of contextual features include the status of the client device and configuration information about the client devices. Indicators of client device status include available memory and processing power. Display device configuration information includes the size and resolution of the display device screen as well as the size of the display area and resolution for the animation file. Additionally, attributes of the animation file may be used by the application associated with the digital magazine server to determine the number of frames to load into memory. Example attributes of an animation file include pixel characteristics and color characteristics of the animation file as well as a number of frames in the animation file and durations of each frame. Having preloaded a number of frames in the animation file to the memory based on the contextual factors or the attributes of the animation file, the client device displays the animation file by retrieving successive preloaded frames from the memory.

When the digital magazine concurrently displays multiple animation files, the client device may not have sufficient computing resources to correctly display frames of an animation file for the display durations associated with the frames. For example, if the client device does not have sufficient available memory to preload the multiple animation files, the client device displays a frame of an animation file for longer than the frame's associated display duration while retrieving the subsequent frame. To ensure correct display of animation files when animation files are concurrently displayed, the client device selects a subset of the animation files to display based at least in part on one or more attributes of the animation files. Example attributes of an animation file include a number of frames in the animation file, a display duration associated with a frame, and pixel dimensions of the frames, which indicate the computing resources for preloading and displaying the animation file. The client device also obtains contextual features, such as those described above, identifying computing resources available to display animation files. By comparing the available computing available against the computing resources for preloading and displaying different animation files, the client device determines a number of animation files to select. The animation files are selected from a ranking of the animation files, which is based at least in part on attributes of the animation file such as display position, display size, and type of animation file. In some embodiments, the ranking may also reflect user interest in the animation file, as determined based on user demographics and previous interactions with content in a digital magazine, for example. The selected animation files are preloaded into the memory, and frames of the selected animation files are displayed in sequence according to their associated display durations.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine. As used herein, "images" may refer to pictures or visual representations of data in both animated and still formats. Examples formats for images include Joint Photographic Experts Group (JPEG), Tagged Image File Format (TIFF), Graphics Interchange Format (GIF), Portable Network Graphics (PNG) format, Windows bitmap (BMP) format, and any other types of file formats capable of visual display on a digital device.

System Architecture

Figure 1:
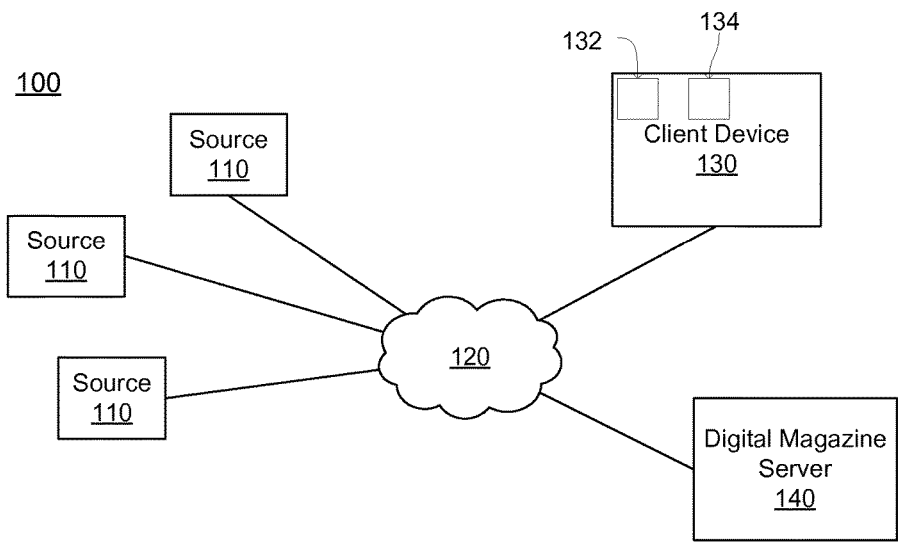
FIG. 1 is a block diagram of a system environment in which a digital magazine server operates, in accordance with an embodiment.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine servers 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display device 132s 132 with different characteristics. For example, different client devices 132 have display device 132s 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device 130 may include multiple input devices 134 in some embodiments. Inputs received via the input device 134 may be processed by a digital magazine application associated with the digital magazine server 140 and executing on the client device 130 to allow a user of a client device to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
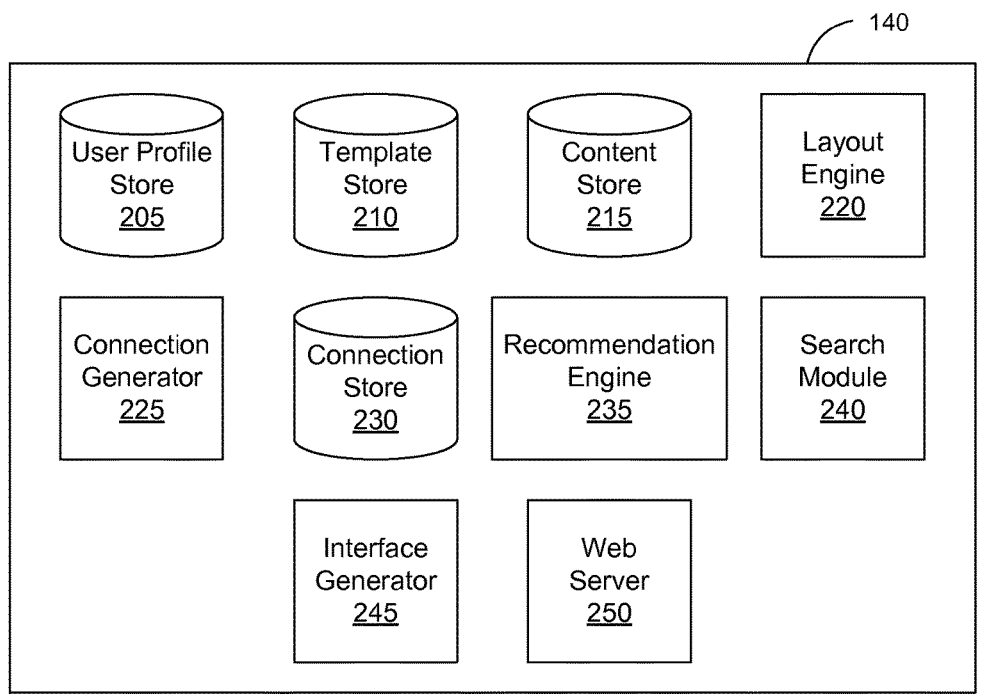
FIG. 2 is a block diagram of a digital magazine server, in accordance with an embodiment.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client device 130s 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represents various types of content. For example, the content store 215 stores content items received from one or more sources 115 within a threshold time of a current time. Examples of content items stored by the content store 215 include a page post, a status update, a photograph, a video, a link, a shared content item, a gaming application achievement, a check-in event at a local business, a brand page, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel (e.g., e-mail).

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Example attributes of content items include a type (e.g., image, story, link, video, audio, etc.), a source 110 from which a content item was received, time when a content item was retrieved, and subject matter of a content item. Example characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate a more refined set of recommended content items. For example, a setting included in a user's user profile specifies a length of time for analyzing content items to identify content items for recommending to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 134 of a client device 130 with modifications to content presented by a digital magazine. As an example, if the input device 134 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 134 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device 130 operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by an application associated with the digital magazine server 140 (a "digital magazine application") executing on a client device 130, or may be provided by a combination of the digital magazine server 140 and a digital magazine application executing on a client device 130. In one embodiment, a combination of the digital magazine server 140 and the client device 130 is used to preload and display animation files in a digital magazine. For example, the digital magazine server 140 determines a priority for displaying one or more animation files to a user by generating a ranking of various animation files based on the relevance of the animation files to the user. Additionally, the digital magazine server 140 determines the position of content items corresponding to one or more animation files relative to each other and relative to other content items. The ranking, position information, and other information for displaying the animation files are communicated from the digital magazine server 140 to a client device 130 via the network 120. The client device 130 uses the received information as well as locally obtained contextual information describing the client device 130 to determine the order in which animation files are displayed.

Page Templates

Figure 3:
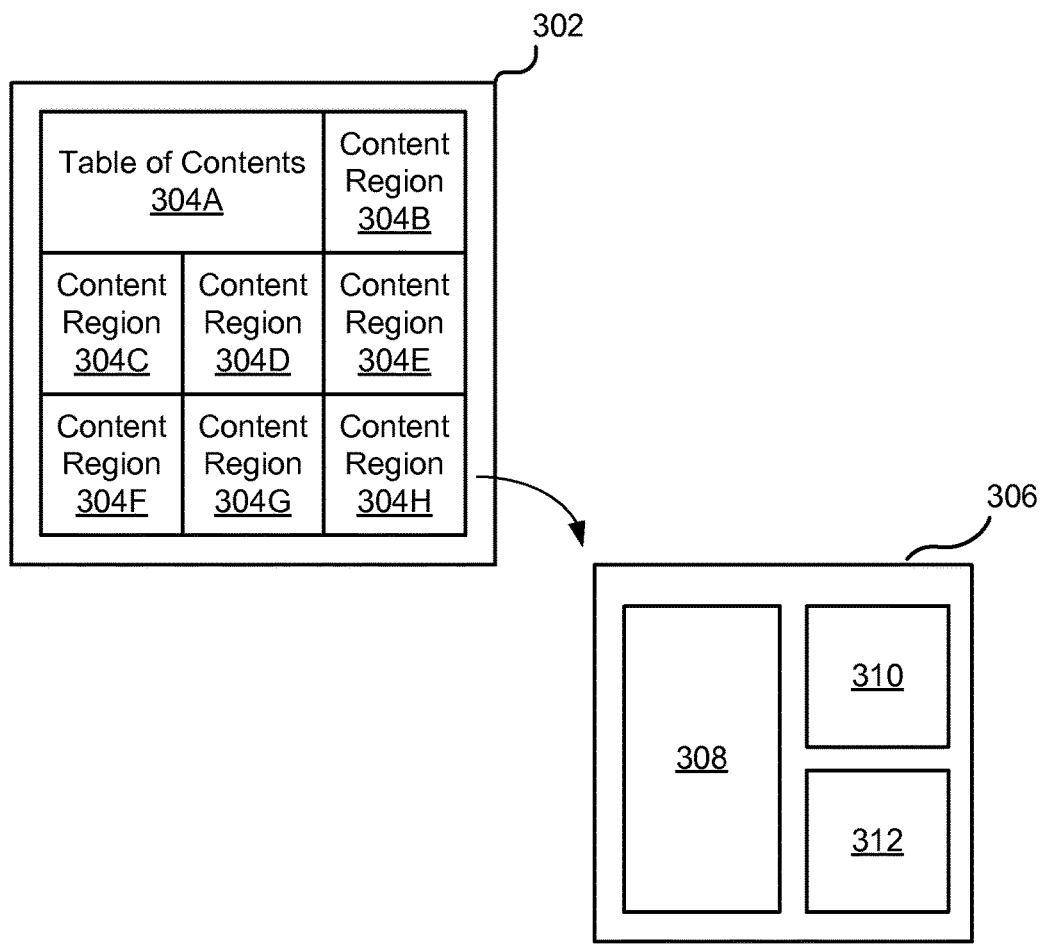
FIG. 3 is an example of presentation of content items in a digital magazine using a page template, in accordance with an embodiment.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Animation Files

Figure 4:
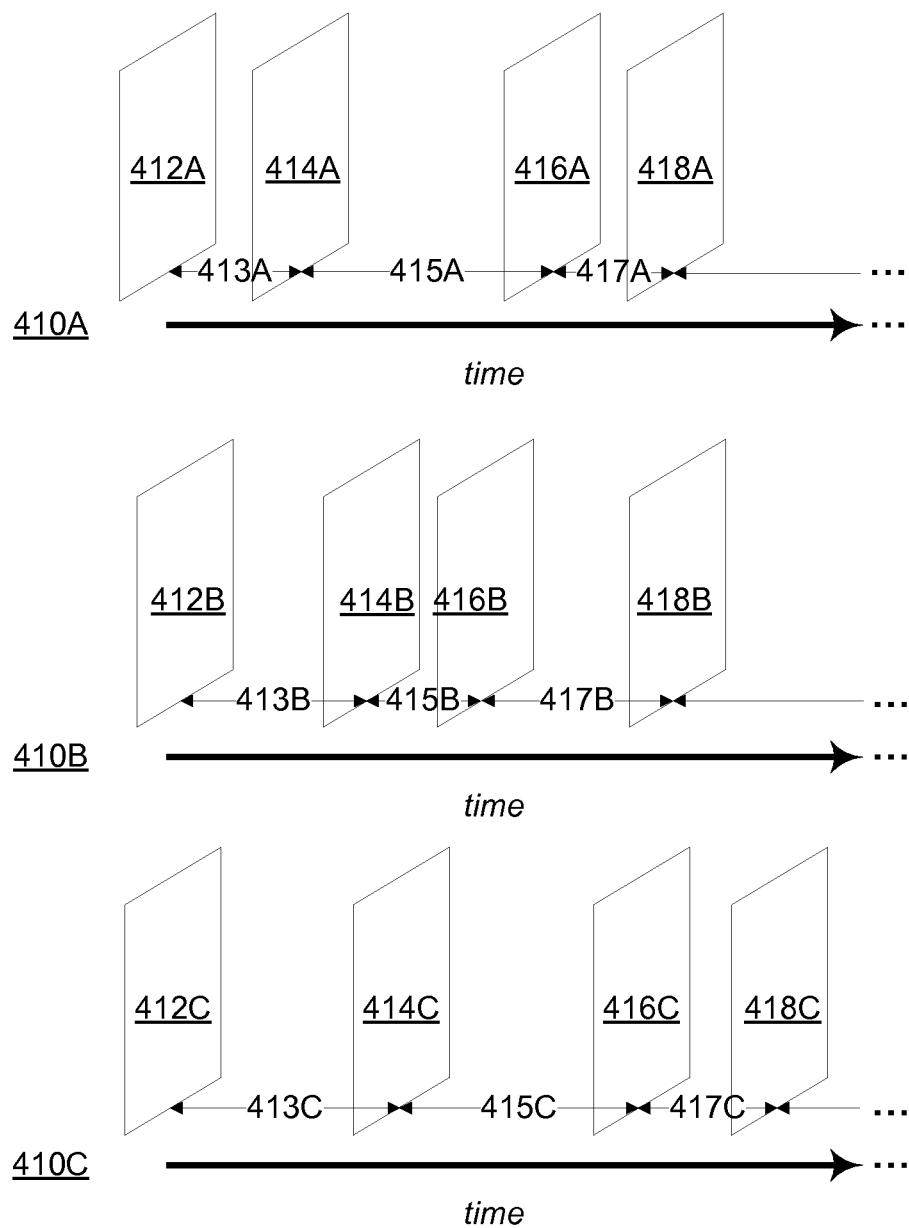
FIG. 4 is a diagram of an example showing preloading of frames of animation files over time, in accordance with an embodiment.

FIG. 4 is a diagram of animation files preloaded into a memory of the client device 130. The example of FIG. 4 shows animation files 410A, 410B, and 410C. Animation file 410A includes frames 412A, 414A, 416A, and 418A; frames 412A, 414B, 414 416A have display durations 413A, 415A, 417A, respectively. Similarly, animation file 410B includes frames 412B, 414B, 416B, and 418B, with display durations 413B, 415B, and 417B corresponding to frames 412B, 414B, and 416B, respectively. Animation file 410C includes frames 412C, 414C, 416C, and 418C, with display durations 413C, 415C, and 417C corresponding to frames 412C, 414C, and 416C, respectively. As used herein, the display duration of a frame is the duration of time that the content of a frame is presented on a display device 132 of the client device 130 after the frame is fully rendered. FIG. 4 illustrates frames 412, 414, 416, and 418 on a horizontal time axis for various animation files 410, with a frame's position along the time axis corresponding to the time at which the frame 412, 414, 416, or 418 is fully rendered and displayed. The animation files 410, frames 412, 414, 416, and 418, and display durations 413, 415, 417 shown in FIG. 4 are for purposes of illustration, and any number of animation files, each having an arbitrary number of frames with variable display durations, may be preloaded according to the present disclosure.

An animation file 410 is content originating from a source 110 and stored in the content store 215 at the digital magazine server 140, which communicates one or more of the animation files 410 to a client device 130 via the network 120 for presentation to a user. At least one of the animation files 410 is displayed on the display device 132 in a content region of a page generated by an application associated with the digital magazine server 140 and executing on the client device 130. An animation file 410 may be displayed without input from the user via the input device 134, or may be displayed in response to an input received via the input device 134. For example, the display device 132 initially displays a preview portion of an animation file 410 (e.g., the first image of the animation file 410), and then displays the animation file 410 in response to the client device 110 receiving a selection of the preview portion via the input device 134.

The animation files 410 may have any suitable format. Examples formats for animation files include Graphics Interchange Format (GIF), Multiple-image Network Graphics (MNG) format, Animated Portable Network Graphics (APNG) format, and Scalable Vector Graphics (SVG) format. An animation file 410 includes frames 412, 414, 416, and 418, which are data describing images for presentation by a display device 132. The data comprising a frame 412, 414, 416, or 418 may be a rasterized or pixilated image, a vector graphics image, a compound image of pixels and vectors, or other suitable image data whether intended to support animation or not. Example formats of data included in a frame include GIF, Portable Network Graphics (PNG) format, SVG format, bitmap (BMP) format, and Joint Photographic Experts Group (JPEG) format.

The display durations 413, 415, and 417 are the periods of time for which frames 412, 414, and 416, respectively, are displayed. For example, the frame 412A is the currently displayed frame from animation file 410A. After the frame 412A has been fully rendered and displayed for the display duration 413A, the frame 414A is rendered and displayed for display duration 415A after it is fully rendered. A display duration 413, 415, or 417 may have a variable time length depending on the desired display appearance of an animation file 410 or of various animation files 410A, 410B, 410C. In various embodiments, display durations 413, 415, 417 within an animation file 410 may be variable or constant.

To display an animation file 410, the client device 130 accesses the animation file 410 and preloads frames from the animation file 410 into a memory, such as a frame buffer, on the client device 130. The client device 130 retrieves frames from the memory for rendering and display via a display device 132. An animation file 410 may be displayed a single time or multiple times (i.e., repeated) after its corresponding frames are preloaded in the memory of the client device 130. To enable uninterrupted display of the accessed animation file 410, a number of frames of the animation file 410 preloaded into the memory is determined based on one or more contextual features of the client device 130. Contextual features of the client device 130 describe computing resources of the client device 130 used for displaying content items. Example contextual features include indicators of the status of the client device 130 and the configuration of the display device 132 of the client device 130. The status of the client device 130 refers to computing resources available for preloading of animation files 410. The configuration of the display device 132 refers to characteristics of the display device 132 that affect display of animation files 410. Example information comprising the configuration of the display device 132 includes the physical size of the display device 132, the display resolution of the display device 132, the size of pixels of the display device 132, or other characteristics affecting the capability of the display device 132 to render the animation file 410.

Indicators of the status of the client device 130 may include an indicator of available processing resources, an indicator of available memory resources, or an indicator of network connectivity. Additional indicators of the status of the client device 130 include a moving average of a time taken to generate a specified number of frames for display on the display device 132 or a duration of time that frames displayed in a threshold time from a current time were displayed beyond their associated display durations. An indicator of available processing resources measures the availability of one or more processors (e.g., a central processing unit (CPU), a graphics processing unit (GPU)) on the client device 130 for completing tasks to preload or display an image. Example indicators of available processing resources include a number of processors, a number of processor cores, a rated processing throughput, a processing throughput rate, or an indication of other demands on a processor. An indicator of memory resources measures availability of memory (e.g., a cache, random access memory, flash memory) on the client device 130 to preload and store preloaded frames. Example indicators of memory resources include a total amount of memory capable of preloading frames, total available memory, a number of low memory warnings generated by the client device 130, and an elapsed time since a recent low memory warning. An indicator of network connectivity measures availability of data from a source external to the client device 130 (e.g., the source 110, the digital magazine server 140) via the network 120. Example indicators of network connectivity include a rate of data transfer (e.g., an average of recent data transfer rates), a type of network connection, or an indicator of network connection reliability (e.g., probability of network connection availability based on recent connectivity).

When determining a number of frames of an animation file 410 to preload into a memory of the client device 130, the client device 130 considers attributes of content to be displayed by the animation file 410 in addition to contextual features. Attributes of displayed content are characteristics affecting computing resources expended to display the content. Example attributes of content displayed by the animation file 410 include attributes of the animation file 410, attributes of other content (e.g., images, videos, text, or other animation files 410) displayed by the client device 130, and aggregate attributes of content displayed on the display device 132. Attributes of an animation file 410 include a number of frames in the animation file 410, display durations associated with frames of the animation file 410, as well as the pixel dimensions and color configuration of various frames in the animation file 410. A type of the animation file 410 (e.g., an advertisement, an illustration within an article, a headline illustration representing a content item in a table of contents) is another example attribute of the animation file 410. Attributes of other content items include display dimensions, pixel dimensions, and content item file size. Aggregate attributes of content include the number of animation files 410 or other content displayed or an average or total file size of the displayed animation files 410 or other content.

If the client device 130 has insufficient computing resources or memory to display the animation file 410, the client device 130 may incorrectly display the animation file 410. For example, the animation file 410A is incorrectly displayed if frame 412A is displayed for the display duration 413A, but the next frame 414A is not completely preloaded in the memory. In this example, the next frame 414A cannot be displayed correctly, so the display 312 displays the current frame 412A beyond its display duration 413A while the next frame 414A is preloaded. The client device 130 may use the duration of time that a frame is displayed beyond its associated display duration as an indicator of recent performance.

Buffer for Storing Frames of Preloaded Animation Files

Figure 5:
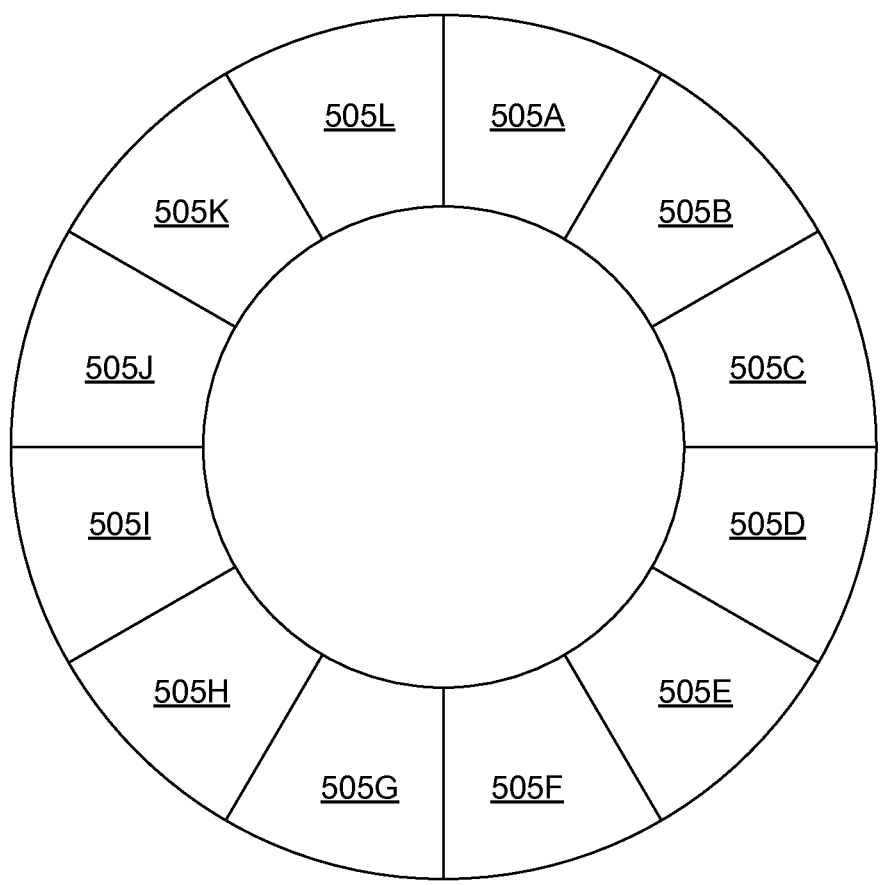
FIG. 5 is a conceptual diagram illustrating an example data structure for storing preloaded frames of animation files, in accordance with an embodiment.

FIG. 5 is a conceptual diagram illustrating an example data structure for storing preloaded frames of animation files. In the example of FIG. 5, the data structure is a circular buffer 500 including memory locations 505A-505L (also referred to individually and collectively using reference number 505) for storing preloaded frames of an animation file. The memory locations 505 may identify adjacent addresses in a memory of the client device 130 (e.g., as in an array data structure) or non-adjacent addresses in the memory of the client device 130 (e.g., as in a linked list data structure). In one embodiment, the circular buffer 500 includes a number of memory locations 505 that equals or exceeds a number of frames in the animation file. Adjacent memory locations 505 correspond to sequentially displayed frames of the animation file. For example, memory locations 505A and 505B respectively correspond to a first and a second frame of the animation file. To display an animation file, the client device 130 accesses memory locations 505 counterclockwise or clockwise around the circular buffer 500 to retrieve consecutive frames of the animation file for presentation.

While displaying an animation file, the client device 130 determines a number of frames to preload into the circular buffer 500 and then obtains the number of frames from the animation file that are subsequent to a currently displayed frame. For example, while the display device 132 presents the frame stored in memory location 505A, the client device 130 determines to preload three subsequent frames in the memory. The client device 130 identifies the three subsequent frames from the animation file and verifies that the identified subsequent frames are preloaded in the corresponding memory locations 505B, 505C, and 505D. If an identified frame is not preloaded, the client device 130 accesses the source of the animation file (e.g., a source 110, the content store 215, a low-access-speed memory of the client device 130) and stores the identified frame in memory location 505B, 505C, or 505D. For example, if the client device 130 has relatively low available memory resources, the client device 130 preloads fewer frames to reduce memory used by the circular buffer 500. Conversely, if the client device 130 has available memory resources but is constrained by processing resources, the client device 130 may increase the number of frames stored by the circular buffer 500.

After displaying the frame stored in memory location 505A for its display duration, the client device 130 may discard the data stored in memory location 505A to reduce memory usage. In one embodiment, the client device 130 determines to preload all the frames of an animation file into memory unless there are insufficient memory resources to do so. When the determined number of frames to preload equals the number of frames in the animation file, the client device 130 stores frames in the circular buffer 500 until the animation file has been completely displayed. If the animation file is a repeating animation file, the client device 130 accesses a memory location 505A corresponding to the first frame after accessing the memory location 505L corresponding to the last frame and after displaying the last frame for its display duration, so the client device 130 preloads frames at the beginning of the animation file while displaying a frame near the end of a repeating animation file.

In addition to preloading frames while displaying an animation file, the client device 130 may preload frames prior to displaying an animation file. To do so, the client device 130 determines the number of frames to preload into memory, preloads the number of frames into memory, and then begins display of the animation file. The determined number of frames may correspond to a number of frames to enable correct display of the animation file. In one embodiment, a preview portion of the animation file is displayed until at least the determined number of frames are preloaded in the circular buffer 500.

Preloading Frames of an Animation File for Presentation

Figure 6:
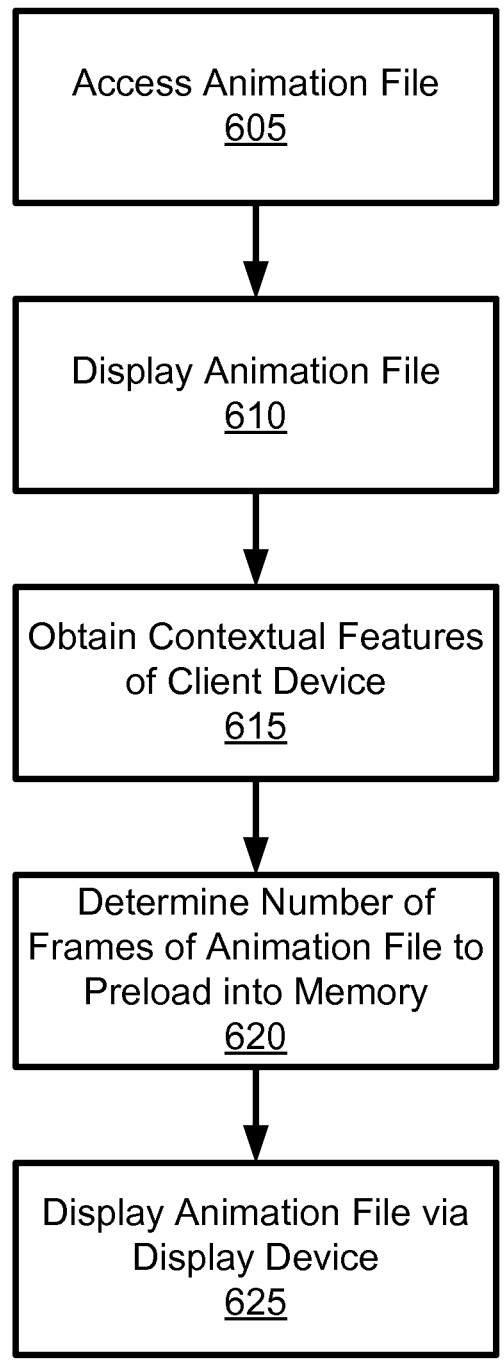
FIG. 6 is a flowchart of a process for preloading frames of an animation file into a memory of a client device, in accordance with an embodiment.

FIG. 6 is a flowchart of a process for preloading frames of an animation file into a memory of a client device 130, in accordance with an embodiment. The steps of the process described in conjunction with FIG. 6 may be performed in different orders than the order described in conjunction with FIG. 6. For example, steps that are described as simultaneous may be performed in sequence or partially in parallel. In some embodiments, different and/or additional steps than those described in conjunction with FIG. 6 may be performed.

An application associated with the digital magazine server 140 executing on the client device 130 accesses 605 one or more animation files for presentation in a digital magazine. In one embodiment, the animation files are received from one or more sources 110 or from the digital magazine server 140 and stored in a storage device, such as a memory, of the client device 130. An animation file is displayed in a content region of a page of the digital magazine. As described above, the animation file includes a plurality of frames providing a graphical representation of data, where each frame has a variable display duration. As used herein, the display duration of a frame is the duration of time that the content of a frame is presented on a display device 132 of the client device 130 after the frame is fully rendered. One or more animation files may include frames that are arranged in the memory of a client device 130 as a series of images to be displayed in a sequence having a temporal order. In some embodiments, the sequence repeats after the last image in the series of images is displayed.

In some embodiments, multiple animation files are accessed 605, allowing presentation of multiple animation files on the display device 132 of the client device 130. For example, one or more animation files are accessed 605 from a group of animation files based on a ranking. The ranking may be received from the digital magazine server 140 and orders the animation files based on a measure of likely interest in the animation files by a user associated with the client device 130. For example, the ranking may be based on prior interactions of the user with content or other suitable information. Ranking of multiple animation files is described further with in conjunction with FIG. 7. The digital magazine server 140 may periodically communicate a ranking of animation files to the client device 130, allowing the digital magazine server 140 to update the ranking as users interact with various content items and allowing the client device 130 to maintain an updated ranking.

One or more frames from the accessed animation file are displayed 610 in a portion of the display device 132 of the client device 130. For example, one or more frames from the accessed animation file are displayed 610 in a portion of the display device 132 corresponding to a content region of a page of the digital magazine, allowing additional content items to be presented along with the one or more frames from the accessed animation file. Frames from the animation file are preloaded into a memory, such as a frame buffer, of the client device 130 and retrieved from the memory for rendering and display 610. To allow display 610 of the accessed animation file without interruption, the client device 130 determines a number of frames of the animation file to preload into the memory determined based on one or more contextual features of the client device 130.

The application associated with the digital magazine server 140 and executing on the client device 130 obtains 615 one or more contextual features describing computing resources used by the client device 130 to display content items. In one embodiment, the application associated with the digital magazine server 140 communicates with an operating system and/or other applications executing on the client device 130 to retrieve information about computing resources used by the client device 130 when content items are displayed. The obtained contextual features indicate the status of the client device 130, which provides an indication of computing resources (e.g., memory resources, processing resources) available for preloading and displaying the animated file. For example, the status of the client device 130 indicates an amount of memory (e.g., total memory, memory of a certain type, memory having a data transfer rate above a threshold) available to the client device 130, an amount of free memory of the client device 130, a time between a current time and a time of a most recent low memory warning of the client device 130, a number of low memory warnings of the client device 130 within a specified time, or any other suitable information. Another example status of the client device 130 indicates a current usage of a processor included in the client device 130, a number of cores of the processor included in the client device 130, or other suitable information. The status of the client device 130 may also include an amount of time used by the client device 130 for rendering and displaying a specified number of frames of an animation file. For example, the application determines a moving average of a time for the client device 130 to render and to display a specified number of frames of an animation file. Additionally, the obtained contextual features may include configuration information of the display device 132, such as a binary or a numerical characteristic of the display device 132. Example configuration information of the display device 132 includes a display area of the display device 132, a display resolution of the display device 132, a size of pixels in the display device 132, a capability of the display device 132 to render the animation file, or other suitable information.

Based at least in part on the obtained contextual features of the client device 130 and the display durations of frames in the displayed animation file subsequent to a currently displayed frame, the application associated with the digital magazine server 140 executing on the client device 130 determines 620 a number of frames of the displayed animation file subsequent to a currently displayed frame to preload into memory. Hence, the number of frames to preload into the memory accounts for the display duration of various frames as well as the computing resources available to the client device 130 for displaying content items. Information about the displayed animation file may also be used when determining 620 the number of frames of the displayed animation file to preload into memory of the client device 130. For example, pixel dimensions of the animation file, a total number of frames in the animation file, a colorspace of the animation file, an alpha channel of the animation file, or any other suitable characteristics of the animation file may be used to determine 620 the number of frames to preload into memory.

In one embodiment, the application associated with the digital magazine server 140 that executes on the client device 130 determines whether at least a threshold number or percentage of frames of the displayed animation file are capable of being preloaded into the memory. If the number of frames capable of being preloaded into the memory based on the contextual factors and the display durations associated with frames of the animation file satisfy the threshold, the determined number of frames are preloaded into the memory. If the contextual features and the display durations associated with frames of the animation file do not satisfy the threshold, a minimum number of frames for displaying the animation file without pauses are preloaded into the buffer. For example, if there are sufficient memory resources to preload all of the frames of an animation file into memory, the client device 130 preloads all of the frames of the animation file into memory to conserve processing resources. As another example, if there are insufficient memory resources to preload all of the frames of an animation file, the client device preloads a number of frames sufficient to correctly display the animation file, which reduces expenditure of memory resources. Any suitable criteria may be used to determine 620 the number of frames of the animation file to preload into the memory based on the contextual features of the client device 130. The frames of the animation file preloaded into the memory are subsequently displayed 625 to the user via the display device 132.

While frames of the animation file are displayed 625 to the user in a portion of the display device 132, the application associated with the digital magazine server 140 and executing on the client device 130 may obtain updated contextual features about the client device 130 at various time intervals. This allows the client device 130 to update the number of frames of the animation file that are preloaded into memory as the contextual features of the client device 130 vary. For example, additional applications may consume resources of the client device 130, reducing the computing resources available for displaying content items, which alters the number of frames to preload into memory for correctly presenting the animation file. The number of frames preloaded into the memory of the client device 130 may be modified based on the updated contextual features of the client device 130 to improve presentation of the animation file via the digital magazine.

For purposes of illustration, FIG. 6 describes display of a single animation file. However, multiple animation files may be displayed in different portions of the display device 132 when the digital magazine is displayed by the client device 130. The display duration of frames of each of the displayed animation files and obtained contextual features of the client device 130 may be used to determine a number of frames of each of the displayed animation files to preload into memory of the client device 130. Additionally, the application associated with the digital magazine server 140 may repeatedly display multiple animation files on the display device. While repeatedly displaying the animation files, the application repeatedly obtains contextual features about the client device 130 and repeatedly determines a number of frames to preload into the memory of the client device 130 based on the contextual features of the client device 130 and the display duration of frames in the animation files being displayed.

Selecting Animated Files to Preload

Figure 7:
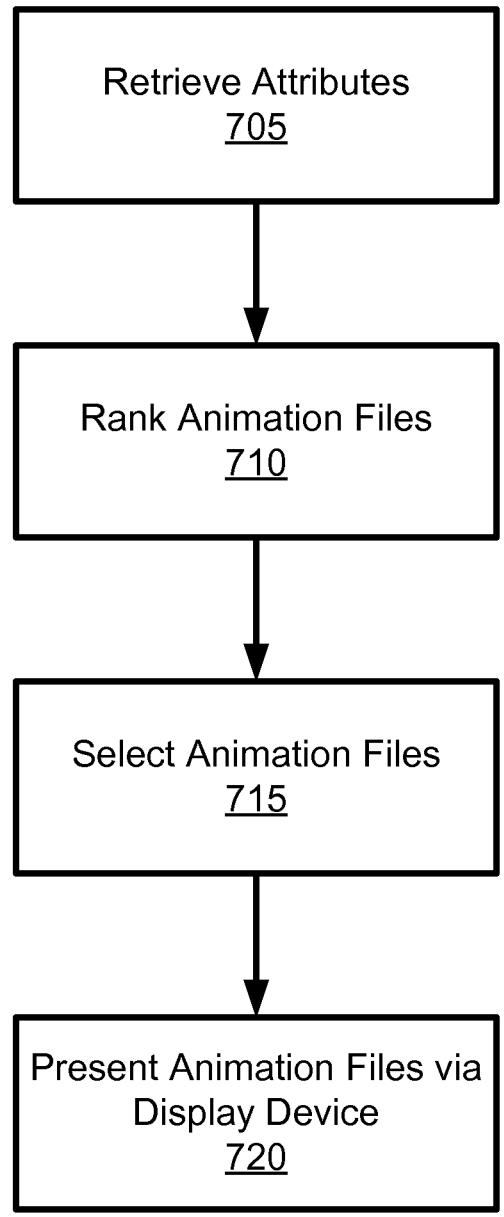
FIG. 7 is a flowchart of a process for selecting animation files for preloading into a memory of a client device, in accordance with an embodiment.

FIG. 7 is a flowchart of one embodiment of a process for selecting animation files to preload into a memory of a client device 130. The steps of the process described in conjunction with FIG. 7 may be performed in different orders than the order described in conjunction with FIG. 7. For example, steps that are described as simultaneous may be performed in sequence or partially in parallel. In some embodiments, different and/or additional steps than those described in conjunction with FIG. 7 may be performed.

An application associated with the digital magazine server 140 and executing on the client device 130 retrieves 705 attributes of an animation file or other contextual features. To select animation files, the application retrieves 705 attributes of various animation files available for presentation. Attributes of an animation file describe one or more characteristics of the animation file affecting computing resources expended to preload and display the animation file. Example attributes of an animation file include display durations associated with frames of the animation file, pixel dimensions of the animation file, and a number of frames in the animation file. Other attributes of an animation file include a display position of the animation file on the page of the digital magazine. For example, the application associated with the digital magazine server 140 executing on the client device 130 determines that the animation file is to be displayed in a content region in an upper-left corner of the page of the digital magazine. Attributes of other content displayed along with the animation files on a page of the digital magazine may also be retrieved 705. Contextual features describing computing resources available to the client device 130, such as those described above in conjunction with FIG. 6, for preloading and displaying the animation files may also be retrieved 705.

The application associated with the digital magazine server 140 and executing on the client device 130 ranks 710 animation files according to the retrieved attributes of the animation files. In one embodiment, a score is determined for each animation file based at least in part on its associated the retrieved attributes (e.g., using a weighted linear combination). The animation files are then ranked 710 based on their associated scores. Alternatively or additionally, one or more deterministic rules conditional on attributes of animation files (for binary attributes) or on comparison of an animation attribute to a threshold (for numerical attributes) are applied to the animation files, with the ranking determined based on results of application of the rules. In one embodiment, certain attributes of an animation file correspond to the animation file's visual prominence. For example, animation files having larger pixel dimensions or display dimension are more visually prominent than animation files with smaller pixel or display dimensions. As another example, a location within the display device 132 where an animation file is displayed affects the animation file's visual prominence; for example, an animation file displayed in an upper or a left portion of the display device 132 is considered more visually prominent than an animation file displayed in a lower or a right portion of the display device 132. Certain types of animation files may be ranked 710 higher based at least in part on their received attributes. For example, animation files that are advertisements are ranked above other animation files. Additionally, animation files may be penalized in the ranking according to computing resources for preloading or displaying the animation file. For example, animation files having at least a threshold file size or at least a threshold number of frames are positioned lower in the ranking because they use more space in memory while preloaded.

In addition to attributes of the animation files, information associated with a user of the client device 130 may be used when ranking 710 the animation files. Example information associated with the user includes preferences in the user's user profile, a demographic characteristic of a user, prior interactions between the user and previously presented content items, connections between the user and other users via the digital magazine server 140 or a social networking system, interactions with content items by users to which the user is connected, or other information indicating a user preference for content. Examples of prior interactions with content items by the user include whether a user has previously viewed content items, if the user has previously interacted with content items, if the user has shared a content item with another user, if the user has recommended a content item to another user, or if the user has indicated an opinion about a content item. Interactions with content items by a user may be retrieved from the connection store 230 on the digital magazine server 140. Example connections between a user and other users include users with whom the user has previously shared or recommended content items, additional users connected to the user via a social networking system that the digital magazine server 140 is authorized to access. Interactions with content items by additional users connected to the user may also be used when ranking 710 the content items. Connections between different animation files and content with which the user has previously interacted may be retrieved, for example from the connection store 230 of the digital magazine server 140, and used to determine a measure of similarity between an animation file and content with which the user previously interacted. Hence, characteristics of the user, characteristics of various animation files, and characteristics of content with which the user previously interacted are used to determine a measure of relevance to the user for each animation file, with the animation files ranked 710 based on their associated measures of relevance. For example, the digital magazine server 140 ranks 710 the animation files based on the user's prior interactions with previously presented content items, interactions with content items by additional users of the digital magazine server 140 connected to the user via a social networking system or via the digital magazine server 140, a degree of similarity between an animation file and content with which the user previously interacted, or any other suitable data. In one embodiment, animation files with higher measures of relevance have higher positions in the ranking.

Based on the determined ranking, one or more animation files are selected 715 for preloading into a memory of the client device 130. The digital magazine server 140 may communicate the ranking to the client device 130, where an application associated with the digital magazine server 140 selects 715 the one or more animation files based on the ranking and contextual features associated with the client device 130. In one embodiment, the application associated with the digital magazine server 140 determines a number of animation files that may be displayed correctly based on contextual features of the client device 130. As described above, an animation file displays incorrectly if a frame of the animation file displays for longer than the display duration associated with the frame because a subsequent frame has not be preloaded into the memory of the client device 130. Hence, to correctly display an animation file, the client device 130 displays each frame of the animation file for a length of time that does not exceed the display duration associated with each frame. If the application determines that all of the animation files available for display on the displayed page may be displayed correctly, then the application associated with the digital magazine server 140 selects 715 all of the available animation files. If there are more animation files available for display in the content regions of a displayed page than the determined number of animated files, then the application associated with the digital magazine server 140 selects 715 a subset of the animation files for display based at least in part on the ranking.

As described above in conjunction with FIG. 6, contextual features describing computing resources available to the client device 130 for presenting animation files are analyzed along with attributes of various animation files (e.g., display durations of frames in various animation files) to select 715 animation files for presentation. To present a user with animation files likely to be of interest to the user, the ranking of animation files is also used to select 715 animation files. In one embodiment, the application associated with the digital magazine server 140 selects 715 animation files having highest positions in the ranking, or having at least a threshold position in the ranking, and having attributes that do not exceed the computing resources available to the client device 130. Alternatively, the application associated with the digital magazine server 140 identifies animation files having attributes that do not exceed the computing resources available to the client device 130 and selects 715 animation files from the identified animation files that have the highest positions in the ranking or that have at least a threshold position in the ranking. For example, animation files with a large file size or numerous frames consume more computing resources animation files with a small file size and with fewer frames, so the application associated with the digital magazine server 140 may select 715 a higher number of the smaller animation files for preloading.

In one embodiment, the application associated with the digital magazine server 140 determines the number of animation files to select and then selects 715 the determined number of animation files based on the ranking. For example, the application associated with the digital magazine server 140 identifies animation files having less than a threshold size and selects 715 animation files from the identified animation files that have the highest positions in the ranking. Alternatively or additionally, the application employs a greedy algorithm to select 715 animation files. For example, the application selects an animation file having at least a threshold position in the ranking and determines whether the computing resources to be expended to preload and display the selected animation file exceed the available computing resources. If the computing resources to be expended do not exceed the available computing resources, the application selects 715 an additional animation file from the ranking and again compares the computing resources to be expended to preload and display the animation file and the additional animation file to the available computing resources. If the computing resources to be expended do exceed the available computing resources, the application associated with the digital magazine server 140 selects 715 an alternative animation file from the ranking and again compares the resources to be expended to preload and display the animation file and the animation file and the alternative animation file to the available computing resources.

The application associated with the digital magazine server 140 presents 720 the selected animation files via the display device 132. If an animation file is selected 715 for display, the application associated with the digital magazine server 140 preloads one or more frames of the animation file, as described in conjunction with FIG. 6. If an animation file is not selected 715 for display, then the application displays a preview of the animation file, such as a frame of the animation file, but does not display frames of the animation file in sequence. Alternatively, a text description of an animation file that is not preloaded is displayed rather than a frame of the animation file.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for loading animation files into a memory of a client device, the method comprising:

using a computer processor to perform steps, the steps comprising:
accessing a plurality of animation files, each animation file associated with a corresponding visual prominence describing how visually prominent the animation file is displayed in a display of a display device of the client device, and comprising a plurality of frames, each frame having a variable display duration;
determining rankings of the plurality of animation files based on the corresponding visual prominence of each animation file of the plurality of animation files;
selecting an animation file from the plurality of animation files based on corresponding rankings of the plurality of animation files;
displaying the selected animation file in a portion of the display device of the client device according to the corresponding visual prominence of the selected animation file;
obtaining one or more contextual features about the client device, the contextual features describing computing resources used by the client device when displaying frames of one or more animation files;
determining that the computing resources of the client device exceeds computing resources needed for displaying the selected animation file;
responsive to the determination, selecting an additional animation file from the plurality of animation files based on the corresponding rankings of the plurality of animation files; and
displaying the additional animation file in another portion of the display device.

2. The method of claim 1, wherein another one or more animation files from the plurality of animation files are displayed in different portions of the display device.

3. The method of claim 1, further comprising:
repeating display of the selected animation file in the portion of the display device;
obtaining one or more contextual features about the display device as the selected animation file is repeatedly displayed and as the additional animation file is displayed;
determining a number of frames of the selected animation file subsequent to a current frame displayed by the display device to preload into the memory based at least in part on the contextual features of the client device and a display duration associated with one or more of the frames of the selected animation file subsequent to the current frame; and
determining a number of frames of the additional animation file subsequent to a current frame of the additional animation file displayed by the display device to preload into the memory based at least in part on the contextual features of the client device and a display duration associated with one or more of the frames of the additional animation file subsequent to the current frame.

4. The method of claim 1, further comprising:
for each of the selected animation file and the additional animation file, determining a number of frames subsequent to a currently displayed frame to preload into the memory from a current frame based on the contextual features of the client device and a display duration of one or more of the frames subsequent to the currently displayed frame.

5. The method of claim 4, further comprising:
obtaining one or more updated contextual features about the client device while the selected animation file and the additional animation file are displayed in the portions of the display device; and
for each of the selected animation file and the additional animation file, determining a modified number of frames subsequent to the current frame to preload into the memory based at least in part on the updated contextual features of the client device and a display duration associated with one or more of the frames subsequent to the current frame.

6. The method of claim 4, wherein determining a number of frames subsequent to a currently displayed frame to preload into the memory for a selected animation file comprises considering attributes of content of the selected animation file.

7. The method of claim 1, wherein the plurality of frames included in each of the selected animation file and the additional animation file are arranged in the memory as a series of images to be displayed in a sequence having a temporal order, the sequence repeating when the last image in the series of images is displayed.

8. The method of claim 1, wherein obtaining one or more contextual features about the client device comprises obtaining at least one of the following: an indication of memory resources available to the client device, an indication of processing resources available to the client device, and an indication of one or more characteristics of the display device.

9. The method of claim 8, wherein the indication of one or more characteristics of the display device comprises at least one of the following: a display area of the display device, a display resolution of the display device, a size of pixels in the display area of the display device, a capability of the display device to render the animation file, and any combination thereof.

10. The method of claim 1, wherein determining the rankings of the plurality of animation files is based on the corresponding visual prominence of each animation file of the plurality of animation files comprises:
retrieving attributes of each of the plurality of animation files, an attribute describing one or more characteristics of an animation file, wherein one of the retrieved attributes corresponds to the visual prominence of the animation file;
obtaining information associated with a user of the client device;
determining a measure of relevance of each of the plurality of animation files to the user based at least in part on the obtained information; and
determining the rankings of the animation files based at least in part on the retrieved attributes and the measures of relevance.

11. A non-transitory computer readable storage medium storing executable computer program instructions for loading animation file into a memory of a client device, the computer program instructions comprising instructions that when executed cause a computer processor to:
access a plurality of animation files, each animation file associated with a corresponding visual prominence describing how visually prominent the animation file is displayed in a display of a display device of the client device, and comprising a plurality of frames, each frame having a variable display duration;

determine rankings of the plurality of animation files based on the corresponding visual prominence of each animation file of the plurality of animation files;

select an animation file from the plurality of animation files based on corresponding rankings of the plurality of animation files;

display the selected animation file in a portion of the display device of the client device according to the corresponding visual prominence of the selected animation file;

obtain one or more contextual features about the client device, the contextual features describing computing resources used by the client device when displaying frames of one or more animation files;

determine that the computing resources of the client device exceeds computing resources needed for displaying the selected animation file;

responsive to the determination, select an additional animation file from the plurality of animation files based on the corresponding rankings of the plurality of animation files; and display the additional animation file in another portion of the display device.

12. The computer readable medium of claim 11, wherein the computer program instructions further comprise instructions that when executed cause the computer processor to:

for each of the selected animation file and the additional animation file, determine a number of frames subsequent to a currently displayed frame to preload into the memory from a current frame based on the contextual features of the client device and a display duration of one or more of the frames subsequent to the currently displayed frame.

13. The computer readable medium of claim 12, wherein the computer program instructions further comprise instructions that when executed cause the computer processor to:

obtain one or more updated contextual features about the client device while the selected animation file and the additional animation file are displayed in the portions of the display device; and for each of the selected animation file and the additional animation file, determine a modified number of frames subsequent to the current frame to preload into the memory based at least in part on the updated contextual features of the client device and a display duration associated with one or more of the frames subsequent to the current frame.

14. The method of claim 12, wherein determining a number of frames subsequent to a currently displayed frame to preload into the memory for a selected animation file comprises considering attributes of content of the selected animation file.

15. The computer readable medium of claim 11, wherein the plurality of frames included in each of the selected animation file and the animation additional file are arranged in the memory as a series of images to be displayed in a sequence having a temporal order, the sequence repeating when the last image in the series of images is displayed.

16. The computer readable medium of claim 11, wherein the computer instruction for obtaining one or more contextual features about the client device comprise instructions that when executed cause the computer processor to:

obtain at least one of the following: an indication of memory resources available to the client device, an indication of processing resources available to the client device, and an indication of one or more characteristics of the display device.

17. The computer readable medium of claim 16, wherein the indication of one or more characteristics of the display device comprises at least one of the following: a display area of the display device, a display resolution of the display device, a size of pixels in the display area of the display device, and a capability of the display device to render the animation file.

18. The computer readable medium of claim 11, wherein the computer instruction for determining rankings of the plurality of animation files based on the corresponding visual prominence of each animation file of the plurality of animation files comprise instructions that when executed cause the computer processor to:

retrieving attributes of each of the plurality of animation files, an attribute describing one or more characteristics of an animation file, wherein one of the retrieved attributes corresponds to the visual prominence of an animation file;

obtaining information associated with a user of the client device;

determining a measure of relevance of each of the plurality of animation files to the user based at least in part on the obtained information; and determining the corresponding rankings of the animation files based at least in part on the retrieved attributes and the measures of relevance.

* * * * *